(12) United States Patent
Blume

(10) Patent No.: US 7,726,026 B1
(45) Date of Patent: Jun. 1, 2010

(54) POWDERED METAL INLAY

(76) Inventor: George H. Blume, 107 Morning Cloud Cove, Austin, TX (US) 78734

( * ) Notice: Subject to any disclaimer, the term of this patent is extended or adjusted under 35 U.S.C. 154(b) by 0 days.

(21) Appl. No.: 12/429,199

(22) Filed: Apr. 24, 2009

Related U.S. Application Data

(63) Continuation-in-part of application No. 11/382,298, filed on May 9, 2006, now Pat. No. 7,540,470.

(51) Int. Cl.
*F16K 51/00* (2006.01)
(52) U.S. Cl. .................. 29/890.129; 251/359; 251/368
(58) Field of Classification Search ......... 251/333, 251/359, 365, 368; 137/15.18, 902; 29/890.122, 29/890.129, 888.3
See application file for complete search history.

(56) References Cited

U.S. PATENT DOCUMENTS

| | | | |
|---|---|---|---|
| 1,948,628 A | 2/1934 | Penick et al. | |
| 2,918,078 A | 12/1959 | Cummings | |
| 3,186,430 A | 6/1965 | Koutnik | |
| 3,510,103 A | 5/1970 | Carsello | |
| 3,598,145 A | 8/1971 | Wolfson | |
| 3,809,362 A | 5/1974 | Baumann | |
| 4,373,550 A | 2/1983 | Yelich | |
| 4,474,208 A | 10/1984 | Looney | |
| 4,518,329 A * | 5/1985 | Weaver | 251/332 |
| 4,696,321 A | 9/1987 | Reese et al. | |
| 4,714,237 A | 12/1987 | Linderman et al. | |
| 4,770,206 A | 9/1988 | Sjoberg | |
| 4,915,354 A | 4/1990 | Sims, Jr. et al. | |
| 5,060,374 A | 10/1991 | Findlanl et al. | |
| 5,247,960 A | 9/1993 | Kornfeldt et al. | |
| 5,375,813 A | 12/1994 | Rozinsky | |
| 6,298,817 B1 | 10/2001 | Hoeg | |
| 2002/0079332 A1 | 6/2002 | McIntire et al. | |
| 2003/0132415 A1 | 7/2003 | Chigasaki et al. | |

* cited by examiner

*Primary Examiner*—John Bastianelli
(74) *Attorney, Agent, or Firm*—Dennis W. Gilstad

(57) ABSTRACT

Hot-isostatic-pressure (HIP) is used to bond a cemented carbide inlay (e.g., an inlay ring) on a metal substrate (e.g., a hull ring). For example, an inlay ring is made from a powdered metal inlay preform typically comprising at least one metal carbide and at least one nonvolatile cement. The inlay preform is compressed and sintered to make an inlay ring having a predetermined shape, the inlay ring having a modulus of elasticity substantially greater than that of a hull ring. An inlay ring and a hull ring are sealingly vacuum brazed together with at least one evacuated bonding area between them. HIP is applied to compress the hull ring against the inlay ring, thus fusing the hull ring and inlay ring in at least one evacuated bonding area. Following HIP, the inlay ring and hull ring form a fused assembly in which the inlay ring substantially retains its predetermined shape.

17 Claims, 11 Drawing Sheets

POWDERED METAL INLAY

This application is a continuation-in-part of copending U.S. Ser. No. 11/382,298 filed 9 May 2006.

FIELD OF THE INVENTION

The invention relates generally to inlays comprising one or more metal carbides on metal substrates.

BACKGROUND

Valve terminology varies according to the industry (e.g., pipeline or oil field service) in which the valve is used. In some applications, the term "valve" means just the valve body, which reversibly seals against the valve seat. In other applications, the term "valve" includes components in addition to the valve body, such as the valve seat and the housing that contains the valve body and valve seat. A valve as described herein comprises a valve body and a corresponding valve seat, the valve body typically incorporating an elastomeric seal within a peripheral seal retention groove.

Valves can be mounted in the fluid end of a high-pressure pump incorporating positive displacement pistons or plungers in multiple cylinders. Such valves typically experience high pressures and repetitive impact loading of the valve body and valve seat. These severe operating conditions have in the past often resulted in leakage and/or premature valve failure due to metal wear and fatigue. In overcoming such failure modes, special attention is focused on valve sealing surfaces (contact areas) where the valve body contacts the valve seat intermittently for reversibly blocking fluid flow through a valve.

Valve sealing surfaces are subject to exceptionally harsh conditions in exploring and drilling for oil and gas, as well as in their production. For example, producers often must resort to "enhanced recovery" methods to insure that an oil well is producing at a rate that is profitable. And one of the most common methods of enhancing recovery from an oil well is known as fracturing. During fracturing, cracks are created in the rock of an oil bearing formation by application of high hydraulic pressure. Immediately following fracturing, a slurry comprising sand and/or other particulate material is pumped into the cracks under high pressure so they will remain propped open after hydraulic pressure is released from the well. With the cracks thus held open, the flow of oil through the rock formation toward the well is usually increased.

The industry term for particulate material in the slurry used to prop open the cracks created by fracturing is the propend. And in cases of very high pressures within a rock formation, the propend may comprise extremely small aluminum oxide spheres instead of sand. Aluminum oxide spheres may be preferred because their spherical shape gives them higher compressive strength than angular sand grains. Such high compressive strength is needed to withstand pressures tending to close cracks that were opened by fracturing. Unfortunately, both sand and aluminum oxide slurries are very abrasive, typically causing rapid wear of many component parts in the positive displacement plunger pumps through which they flow. Accelerated wear is particularly noticeable in plunger seals and in the suction (i.e., intake) and discharge valves of these pumps.

A valve 110 (comprising a valve body 120 and valve seat 140) that is representative of an example full open design valve and seat for a fracturing plunger pump is schematically illustrated in FIG. 1. FIG. 2 shows how sand and/or aluminum oxide spheres may become trapped between sealing surface 121 of valve body 120 and sealing surface 141 of valve seat 140 as the suction valve 110 closes during the pump's pressure stroke.

The valve 110 of FIG. 1 is shown in the open position. FIG. 2 shows how accelerated wear begins shortly after the valve starts to close due to back pressure. For valve 110, back pressure tends to close the valve when downstream pressure exceeds upstream pressure. For example, when valve 110 is used as a suction valve, back pressure is present on the valve during the pump plunger's pressure stroke (i.e., when internal pump pressure becomes higher than the pressure of the intake slurry stream. During each pressure stroke, when the intake slurry stream is thus blocked by a closed suction valve, internal pump pressure rises and slurry is discharged from the pump through a discharge valve. For a discharge valve, back pressure tending to close the valve arises whenever downstream pressure in the slurry stream (which remains relatively high) becomes greater than internal pump pressure (which is briefly reduced each time the pump plunger is withdrawn as more slurry is sucked into the pump through the open suction valve).

When back pressure begins to act on a valve, slurry particles become trapped in the narrow space that still separates the sealing surfaces of the valve body and seat. This trapping occurs because the valve is not fully closed, but the valve body's elastomeric seal has already formed an initial seal against the valve seat. The narrow space shown in FIG. 2 between metallic sealing surfaces 121 and 141 of the valve body and valve seat respectively is typically about 0.040 to about 0.080 inches wide; this width (being measured perpendicular to the sealing surfaces of the valve body and seat) is called the standoff distance. The size of the standoff distance is determined by the portion of the valve body's elastomeric seal that protrudes beyond the adjacent valve body sealing surfaces to initially contact, and form a seal against, the valve seat. As schematically illustrated in FIG. 2, establishment of this initial seal by an elastomeric member creates a circular recess or pocket that tends to trap particulate matter in the slurry flowing through the valve.

Formation of an initial seal as a valve is closing under back pressure immediately stops slurry flow through the valve. Swiftly rising back pressure tends to drive slurry backwards through the now-sealed valve, but since back-flow is blocked by the initial valve sealing, pressure builds rapidly on the entire valve body. This pressure acts on the area of the valve body circumscribed by its elastomeric seal to create a large force component tending to completely close the valve. For example, a 5-inch valve exposed to a back pressure of 15,000 pounds per square inch will experience a valve closure force that may exceed 200,000 pounds.

The large valve closure force almost instantaneously drives the affected valve, whether suction or discharge, to the fully closed position where the metal sealing surface of the valve body contacts the corresponding metal sealing surface of the valve seat. As the valve body moves quickly through the standoff distance toward closure with the valve seat, the elastomeric seal insert is compressed, thus forming an even stronger seal around any slurry particles that may have been trapped between the seal insert and the valve seat.

Simultaneously, the large valve closure force acting through the standoff distance generates tremendous impact energy that is released against the slurry particles trapped between the metallic sealing surfaces of the valve body and the valve seat. As shown in FIG. 3, the slurry particles that are trapped between approaching valve sealing surfaces 121 and 141 are crushed.

In addition to the crushing action described above, slurry particles are also dragged between the valve sealing surfaces in a grinding motion. This grinding action occurs because valve bodies and seats are built with complementary tapers on the sealing surfaces to give the valve a self-alignment feature as the valve body closes against the seat. As the large valve closing force pushes the valve body into closer contact with the seat, the valve body tends to slide down the sealing surface taper by a very small amount. Any crushed slurry particles previously trapped between the sealing surfaces are then ground against these surfaces, resulting in extreme abrasive action.

To limit sealing surface erosion due to this abrasion, valve bodies and seats have in the past been heat-treated to harden and strengthen them. Typical heat treatment methods have included carburizing, as well as hardening by induction heating and flame hardening. All of these hardening processes depend on quenching (i.e., rapid cooling) of the valve components after they have been uniformly heated, preferably slightly above a critical temperature (called the upper transformation temperature).

When a steel object is uniformly heated to a temperature slightly above its upper transformation temperature, all of the steel in the object assumes a face-centered cubic crystal lattice structure known as austenite. When the object is quenched below this temperature, other crystal lattice structures are possible. If quenched uniformly, the other crystal lattice structures tend to appear uniformly throughout the object. But if certain portions of the object are cooled at rates different from those applicable to other portions of the object, then the crystal lattice structure of the cooled object may be non-uniform.

Further, if steel is heated too far above its upper transformation temperature before quenching, its grain structure may be unnecessarily coarsened, meaning that the steel will then be less tough and more brittle after quenching than it would have been if its maximum temperature had been closer to its upper transformation temperature. It is therefore important that heat treatments for a particular steel be applied uniformly when uniform results are desired, and it is further important that maximum temperatures not be so high as to adversely affect the steel's grain structure.

Quenching is preformed primarily to influence the formation of a desirable crystal lattice and/or grain structure in a cooled metal, a grain being a portion of the metal having external boundaries and a regular internal lattice. Quenching may be accomplished, for example, simply by immersion of a heated metal object in water or oil. Certain tool steels may even be quenched by gas (e.g., air or inert gas), but the carbon steels traditionally used for valve seats can not be gas-quenched if they are to develop the hardness, strength and toughness necessary for use in high-pressure valves.

Heat treating of metals has been extensively studied, and many desirable properties may be obtained in metals through elaborate quench and temper protocols that have been experimentally developed. But preferred heat treatments are highly specific to particular alloys, so there may be no single optimal heat treatment for a component such as a valve seat comprising, for example, a high-alloy sealing surface inlay on a carbon steel substrate. Indeed, even the most careful use of heat treatments to favor development of hard sealing surfaces on strong, tough substrates has not proven effective for extending the service life of valves traditionally used for high-pressure abrasive slurries. Thus, engineers have long sought better methods of hardening valve sealing surfaces at acceptable cost.

For example, incorporation of metallic carbides in sealing surfaces has been investigated because some metallic carbides are extremely hard and wear-resistant. But such carbides do not bond well with the low-carbon steels commonly used in high pressure valve seats. Hence, when metallic carbide inlays are applied to such valve seat substrates, they must actually be held in place by some type of cement which itself forms an adequate bond with the valve seat substrate steel.

To facilitate mixing metallic carbides with cement(s), the carbides are made commercially available in powder form. Such powders (e.g., carbides of vanadium, molybdenum, tungsten or chromium) are formed by casting the pure carbides and then crushing them into the desired particle size. A cement (comprising, e.g., cobalt, chromium, and/or nickel) is then added to the crushed carbide powders, but there is little or no opportunity for the cement to alloy with the carbides.

Metallic carbide particles thus bound as an inlay on a steel substrate are called cemented carbides, and they comprise a matrix consisting of a dispersion of very hard carbide particles in the (relatively softer) cement. The resulting cemented carbide inlays are thus not homogeneous, so they do not possess the uniform hardness that would ideally be desired for good abrasion resistance and toughness in valve sealing surfaces. One problem associated with this inhomogeneity becomes evident because the crushing and grinding of slurry particles between valve sealing surfaces during valve closure produces a variety of slurry particle sizes, some so fine that they are smaller than the spacing between the carbide particles in the cemented carbide inlay. These fine slurry particles are very abrasive, and if they can fit between the carbide particles they can rapidly wear away the relatively soft cement holding the carbide particles in place. Thus loosened (but not actually worn down), the carbide particles can simply be carried away by the slurry stream, leaving the remainder of the inlay cement exposed to further damage by the abrasive slurry. Problems associated with inhomogeneity of cemented carbide inlays may be reduced by choosing relatively high carbide content (e.g., about 85% to about 95%) and sub-micron carbide particle size. Such results have been confirmed by testing according to ASTM B 611 (Test Method for Abrasive Wear Resistance of Cemented Carbides).

Notwithstanding the above problems, cemented carbides, particularly those applied by gas-fueled or electrically-heated welding equipment, have been widely used to reduce abrasion damage in various industrial applications. But weld-applied carbide inlays have not been found acceptable in high pressure valves. This is due in part to a need for relatively high cement content in weld-applied inlays, leading to relatively high porosity inlays having low abrasion resistance and a predisposition to multiple internal stress risers. Low abrasion resistance results from wide spacing of wear-resistant carbide particles, separated by relatively softer cement. And the internal stress risers exacerbate cracking of brittle cemented carbide inlays under the repetitive high-impact loading common in high pressure valves. The result has typically been an increased likelihood of premature (often catastrophic) valve failures. Thus, a long-felt need remains for better technology that can be economically applied to harden valve sealing surfaces while avoiding an excessive likelihood of cracking.

While such cracks are tolerated in certain applications where the cracks do not significantly affect the performance of the part, the same can not be said of high pressure valves. On the contrary, cyclic fatigue associated with the repeated large impact loads experienced by these valves magnifies the deleterious effects of cracks and residual stresses that may result from differentials in coefficients of thermal expansion. Premature catastrophic failures of valve bodies and/or seats are a frequent result.

To address the problem of cracking in high-pressure valve seats, relatively high-carbide tool steel cladding has been applied on low carbon steel substrates. The tool steel cladding is commercially available as a powder in which all the elements have been mixed, melted and then gas atomized into spheres. High grades of these tool steel cladding powders are called P/M (for particle metallurgy) grades, and they generally cost at least 10 times per unit weight more than lower grade tool steels. Notwithstanding the high grade and high cost of the tool steel cladding however, these experimental valve seats have not been successful because the reheat treatment required to reduce the cladding's brittleness does not simultaneously cause development of the required strength and toughness in the low-carbon steel substrate. Further, tool steel powders are limited to carbide concentrations of about 25%, whereas cemented carbides can have carbide concentrations of about 70% to 98%.

The above-noted difficulty of reducing the brittleness of a relatively high carbide P/M inlay while simultaneously developing strength and toughness in a low-carbon steel substrate may be addressed by substituting low grade tool steel (e.g., H13) for the low-carbon steel of the substrate. Residual internal stress is thereby reduced because a cladding matrix of high alloy P/M powder has a coefficient of thermal expansion which closely matches that of a low grade tool steel substrate. Such close matching of thermal expansion coefficients is not seen with inlays of either cemented carbide or tool steel on a low-carbon steel substrate. Further, during the melting and atomization of P/M alloys, the elements combine to form very fine carbides. Some of the carbon and other elements in the P/M powder alloy with the iron to form very high alloy steel, and some of the carbides are then able to alloy with the steel. The combination of the high alloy steel and the very fine alloyed carbides give cladding comprising such P/M tool steel the effect of having nearly uniform hardness and homogeneity throughout.

A typical process of forming P/M grade tool steels comprises induction melting of a pre-alloyed tool steel composition, followed by gas atomization to produce a rapidly solidified spherical powder. This powder may then be applied to a base steel substrate by either weld overlay or, preferably, by hot isostatic pressure (HIP). Of course, the substrate could be eliminated if P/M powder were used to form an entire structure such as a valve seat by use of HIP (i.e., by HIPPING), but the cost of a valve seat comprising 100% of P/M grade tool steels would be prohibitive. And in spite of its high cost, such a valve seat would lack the toughness and strength otherwise obtainable if mild steel or a lower grade tool steel were used as a substrate.

HIP is a preferred method of applying a P/M grade inlay to a substrate because welding degrades some of the potential desirable properties of the inlay. Even when welded ideally, a P/M inlay will lose its fine microstructure in the weld fuse zone, where it melts during welding. Thus, P/M grades, when welded, do not achieve optimal toughness. Further, the melting that occurs during welding will decarburize some of the carbides, decreasing wear resistance. For these reasons, using welding to apply the high alloy P/M grades on heavy impact areas such as a valve seat will always present some risk of cracking in service. Rather, to make best use of high alloy P/M grades, they must be applied by HIP.

The HIP process avoids problems associated with welding because HIP is carried out at a temperature that is slightly lower than the melting temperature of the material being HIPPED. In fact, the ideal HIP temperature is the temperature at which the HIPPED material is only slightly plastic.

In conventional industry practice, HIP-applied inlays as described above require that the P/M powder be subjected to heat and pressure in a sealed enclosure (e.g., a metal can) which is evacuated to less than 0.1 ton (i.e., less than 0.1 mmHg). Empirical data show that this high vacuum is needed to reduce the inlay's porosity to achieve an inlay density of at least 99.7%. High density of the inlay is necessary to prevent formation of porous defects in the finished valve seat. Such porous defects, if present under cyclic fatigue impact loading, act as stress risers which lead to cracks, crack propagation, and catastrophic failure. Establishment of a high vacuum within the sealed HIP enclosure reduces these problems and also avoids undesirable oxidation of both the tool steel substrate and the P/M powder inlay during subsequent heat treatment.

In some pre-HIP applications, P/M powder may be preformed into a shape corresponding to the final inlay position on the substrate. This preforming is generally done independent of the substrate itself. Powder preforms are commonly made using a Cold Isostatic Pressure (CIP) process in which the powder is forged into a physical shape that, while porous (typically about 50% voids), is held intact at the inlay position by mechanical bonds among the powder particles and/or by a binder such as wax or a polymer. Typically, CIP is applied by placing the P/M powder in some type of deformable mold (e.g., rubber) having the desired shape and then pressurizing the mold. The pressurized deformable mold then collapses on the powder, compressing it under very high pressure (typically at least 30,000 psi.). After this compression and prior to HIPPING, any relatively volatile binder such as wax or polymer must be removed or driven off (e.g., by the heat of presintering).

Higher grade P/M powders are generally compressed at relatively high CIP pressures to achieve the necessary structural integrity for a powder preform to prepare it for subsequent application of HIP. This is because the greater hardness of these P/M powders makes the powder particles relatively resistant to the deformation required to achieve sufficiently strong mechanical bonds among the particles. These mechanical bonds may be augmented by use of a binder (e.g., a wax or polymer), although such binders must then be removed prior to HIPPING. Even greater preform structural integrity, as well as increased density and the elimination of volatile binders such as wax or polymer, may be achieved by heating a compressed powder preform to presinter or sinter it. A sintered preform will generally be more likely to retain its shape during handling than a presintered preform, but sintering also encourages metallic grain growth that is associated with preform brittleness.

A metal can used for application of HIP may, if it provides complete sealing around a preform and substrate, facilitate evacuation of the space adjacent to the inlay as described above. For example, the can used in conventional canning for the powder preform has welded seams and completely surrounds both inlay and substrate. A cross-section of a typical welded assembly for conventional canning, with its enclosed valve seat substrate and inlay, is shown in FIG. 4.

Note that a welded can assembly analogous to that of FIG. 4 usually has an evacuation tube. When present, such a tube allows evacuation of the can assembly after it is welded together (with the evacuation tube then being crimped/welded shut to maintain the vacuum within the can assembly). If a can assembly does not have an evacuation tube, this means that the can assembly itself must be welded together in a high-vacuum environment using a technique, such as electron beam welding, which is suitable for welding in a vacuum.

Since the can assembly in FIG. 4 does have an evacuation tube, it may be welded together using conventional techniques. The welded can assembly is tested for leaks with helium, after which the helium and any residual air are then evacuated via the evacuation tube. After evacuation, the evacuation tube is first crimped shut and then welded. The evacuated can assembly is then placed in a HIP furnace that is pressurized (typically with an inert gas) to a pressure of at least about 15,000 psi. Simultaneously, induction coils inside the HIP furnace heat the evacuated can assembly to a temperature just below the melting point of the parts, typically about 2200° F. for tool steels. The pressurized evacuated can assembly is held at this temperature for approximately four hours, after which the P/M tool steel powder has been solidified and forged into an inlay having a metallurgical bond (i.e., fused) with the tool steel valve seat substrate.

Note that the currently practices of various versions of the basic CIP process described above are all relatively expensive. High costs are associated with the molds and the tooling for the upper and lower portions of the can assembly, as well as the special handling required in welding, pressure testing, evacuating, crimping, and sealing can assemblies. In fact, the cost of preparing evacuated can assemblies as described above may substantially exceed the cost of applying HIP to these same assemblies.

SUMMARY OF THE INVENTION

Hot-isostatic-pressure (HIP) is used to bond (by fusion) a substantially nonporous cemented carbide inlay (e.g., an inlay ring) on a corresponding ring-shaped metal substrate (e.g., a hull ring) without the use of conventional canning. In certain applications (e.g., making a valve seat), an inlay ring is made from a ring-shaped powdered metal inlay preform having an outer surface with at least one frusto-conical portion. The preform typically comprises at least one metal carbide (e.g., carbides of vanadium, molybdenum, tungsten and/or chromium) and at least one nonvolatile cement (e.g., cobalt, chromium and/or nickel). The powdered metal inlay preform is compressed (typically by cold-isostatic-pressure or CIP) and sintered. Then the frusto-conical outer surface portion(s) are ground to make an inlay ring having an initial predetermined shape, the inlay ring having a modulus of elasticity substantially greater than the modulus of elasticity of a corresponding hull ring. An inlay ring and a (corresponding) hull ring are assembled to fit closely and then sealingly vacuum brazed together with a filler metal (e.g., BNi-5) to form an evacuated assembly having one or more evacuated bonding areas between the inlay ring and hull ring. HIP is applied directly to the evacuated assembly to compress the hull ring against the inlay ring, thus fusing the hull ring and inlay ring in at least one of the evacuated bonding area(s). Following HIP, the inlay ring and hull ring form a fused assembly in which the inlay ring substantially retains the initial predetermined shape.

The above powdered metal inlay preform may be ground, and/or the metal substrate may be machined, to achieve a close fit prior to application of HIP (HIPPING). Similarly-tapered corresponding frusto-conical portions of preform and substrate may assist in achieving the desired close-fit interface. Nevertheless, the preform and substrate are spaced slightly apart at the start of vacuum brazing. Such close (and substantially uniform) spacing may be achieved, for example, by the presence of powdered filler metal such as BNi-5 between the preform and substrate (see, e.g., U.S. Pat. No. 6,074,604, incorporated herein by reference). In a brazing furnace, an interface comprising similarly-tapered frusto-conical surfaces has a self-centering function, tending to make the longitudinal axes of the preform and substrate collinear. As the furnace temperature is raised under vacuum, excess molten filler metal moves toward the taper edges (i.e., toward the ends of the ring-shaped preform and substrate) as the preform and substrate are drawn gradually together (e.g., by gravity). The result is a strong brazed joint with filler metal distributed thinly and evenly around the interface.

In making a valve seat as described above, a tapered interface between inlay and hull rings comprising similarly-tapered frusto-conical bonding surfaces provides a additional advantages beyond the self-centering function. Because the tapered interface converts a portion of valve body impact force to a force component normal to the interface, the shear component of valve body impact force acting on the interface is reduced. This reduces stress on the inlay-ring-hull-ring fusion bond. Further, the wedging action of the similarly-tapered frusto-conical bonding surfaces under the valve body impact force tends to effectively transmit the force via the hull to one or more peripheral flanges where it can be absorbed without damage.

An embodiment of the invention comprises an inlay ring substantially symmetrical about an inlay ring longitudinal axis and comprising at least one metal carbide and at least one nonvolatile cement. The inlay ring has an inlay ring first end spaced longitudinally apart from an inlay ring second end, and the inlay ring further has a frusto-conical outer surface spaced radially apart from a cylindrical inner surface. Wherein the inlay ring first end extends a first radial distance between the frusto-conical outer surface and the cylindrical inner surface, and the inlay ring second end extends a second radial distance between the frusto-conical outer surface and the cylindrical inner surface, the first radial distance exceeding the second radial distance. The frusto-conical outer surface has an outer surface half-angle with the inlay ring longitudinal axis, and the inlay ring first end comprises a frusto-conical surface having an inlay ring first end half-angle with the inlay ring longitudinal axis, the inlay ring first end half-angle exceeding the outer surface half-angle. The inlay ring first end further comprises a curved intersection with the cylindrical inner surface, the curved intersection having a radius between about 0.5 times and about 1.2 times the first radial distance. The inlay ring comprises between about 1% and about 3% voids, and further comprises between about 70% and about 98% metal carbide. herein said inlay ring has an inlay ring modulus of elasticity.

An alternative embodiment of the invention comprises a hull ring substantially symmetrical about a hull ring longitudinal axis and comprising steel. The hull ring has a hull ring first end spaced longitudinally apart from a hull ring second end, and the hull ring further has a hull ring outer surface spaced radially apart from a hull ring inner surface. The hull ring first end comprising a hull ring first end frusto-conical portion extending outward beginning a first radial distance from the hull ring longitudinal axis, and the hull ring second end extends outward beginning a second radial distance from the hull ring longitudinal axis. The first radial distance exceeds the second radial distance, and the hull ring has a hull ring modulus of elasticity. The hull ring inner surface comprises an inner surface frusto-conical portion extending longitudinally from the hull ring first end. And the inner surface frusto-conical portion has an inner surface half-angle with the hull ring longitudinal axis, while the hull ring first end frusto-conical portion has a hull ring first end half-angle with said hull ring longitudinal axis, the hull ring first end half-angle exceeding the inner surface half-angle.

Another alternative embodiment of the invention comprises a valve seat comprising the hull ring of claim 4 substantially surrounding and closely spaced around the inlay ring of claim 1, the inlay ring longitudinal axis of claim 1 being substantially collinear with the hull ring longitudinal axis of claim 4. Wherein the outer surface half-angle of claim 1 equals the inner surface half-angle of claim 4, and wherein the inlay ring first end half-angle of claim 1 equals the hull ring first end half-angle of claim 4. Further, the hull ring of claim 4 and the inlay ring of claim 1 are sealingly vacuum brazed together with a filler metal, a portion of the inlay ring first end of claim 1 being adjacent to a portion of the hull ring first end of claim 4.

Another alternative embodiment of the invention comprises a method of making an inlay on a metal substrate, the method comprising providing a metal substrate having a substrate modulus of elasticity. The method then comprises providing a compressed powdered metal inlay comprising at least one metal carbide and at least one nonvolatile cement. The method then comprises sintering the compressed powdered metal inlay in an initial predetermined shape to make an inlay preform, the inlay preform having a preform modulus of elasticity substantially greater than the substrate modulus of elasticity. The method then comprises sealingly vacuum brazing the inlay preform to the metal substrate to make an evacuated assembly having at least one evacuated bonding area between the inlay preform and the metal substrate. And the method finally comprises applying hot-isostatic-pressure to the evacuated assembly for bonding (by fusing) the metal substrate to the inlay preform for making an inlay on a metal substrate.

Another alternative embodiment of the invention comprises an inlay ring substantially symmetrical about an inlay ring longitudinal axis and comprising at least one metal carbide and at least one nonvolatile cement. The inlay ring has an inlay ring first end spaced longitudinally apart from an inlay ring second end, and the inlay ring further has a frusto-conical outer surface spaced radially apart from a cylindrical inner surface. Wherein the inlay ring first end extends a first radial distance between the frusto-conical outer surface and the cylindrical inner surface, and the inlay ring second end extends a second radial distance between the frusto-conical outer surface and the cylindrical inner surface, the first radial distance exceeding the second radial distance. The frusto-conical outer surface has an outer surface half-angle with the inlay ring longitudinal axis, and the inlay ring first end comprises a frusto-conical surface having an inlay ring first end half-angle with the inlay ring longitudinal axis, the inlay ring first end half-angle exceeding the outer surface half-angle. The inlay ring first end further comprises a curved intersection with the cylindrical inner surface, the curved intersection having a radius between about 0.5 times and about 1.2 times the first radial distance. The inlay ring comprises between about 1% and about 3% voids, and further comprises between about 70% and about 98% metal carbide. herein said inlay ring has an inlay ring modulus of elasticity.

Another alternative embodiment of the invention comprises a valve seat symmetrical about a longitudinal axis. The valve seat comprises a ring-shaped inlay portion substantially symmetrical about the longitudinal axis and comprising at least one metal carbide and at least one nonvolatile cement. The ring-shaped inlay portion has an inlay portion first end spaced longitudinally apart from an inlay portion second end, and the ring-shaped inlay portion further has an inlay portion outer surface spaced radially apart from a cylindrical inner surface. The ring-shaped inlay portion has an inlay portion modulus of elasticity and a ring-shaped hull portion substantially symmetrical about said longitudinal axis and comprising steel. The ring-shaped hull portion has a hull portion modulus of elasticity, and a hull portion first end spaced longitudinally apart from a hull portion second end. The ring-shaped hull portion further has a hull portion outer surface spaced radially apart from a hull portion inner surface. The hull portion inner surface substantially surrounds and is fused to the inlay portion outer surface. Wherein the inlay portion modulus of elasticity is about 2 times to about 3 times the hull portion modulus of elasticity. And wherein the ring-shaped inlay portion has a radial thickness adjacent to the inlay portion first end. And wherein at least a portion of the inlay portion first end comprises a central valve seat contact area. And wherein the inlay portion first end further comprises a curved intersection with the cylindrical inner surface, the curved intersection being adjacent to the central valve seat contact area and has a radius between about 0.5 times and about 1.2 times the radial thickness. And wherein at least a portion of the hull portion first end comprises a lateral valve seat contact area, the lateral valve seat contact being peripherally adjacent to the central valve seat contact area.

Note that in sealingly vacuum brazing an inlay ring and a hull ring as described herein, a vacuum of about 0.1 torr or better must be created in the brazing furnace to ensure sufficiently high density in the valve seat inlay that is formed during subsequent HIPPING. Note also that brazing with a filler metal comprising, for example, nickel (e.g., BNi-5 or alloys associated with the registered trademarks Colmonoy and Nicrobraz) will tend to protect the sintered carbide particles from loss of carbon (decarburization), thus tending to preserve their hardness and wear-resistance. Certain of these brazing materials can be sprayed on surfaces to be brazed, thus facilitating quality control measures to ensure uniform and highly repeatable results. Note further that frusto-conical surface half-angles are conveniently represented and measured using phantom extensions of the relevant surface which intersect the relevant longitudinal axis, and/or measuring or indicating with respect to one or more phantom lines parallel to the relevant longitudinal axis.

DETAILED DESCRIPTION

Figure 1:
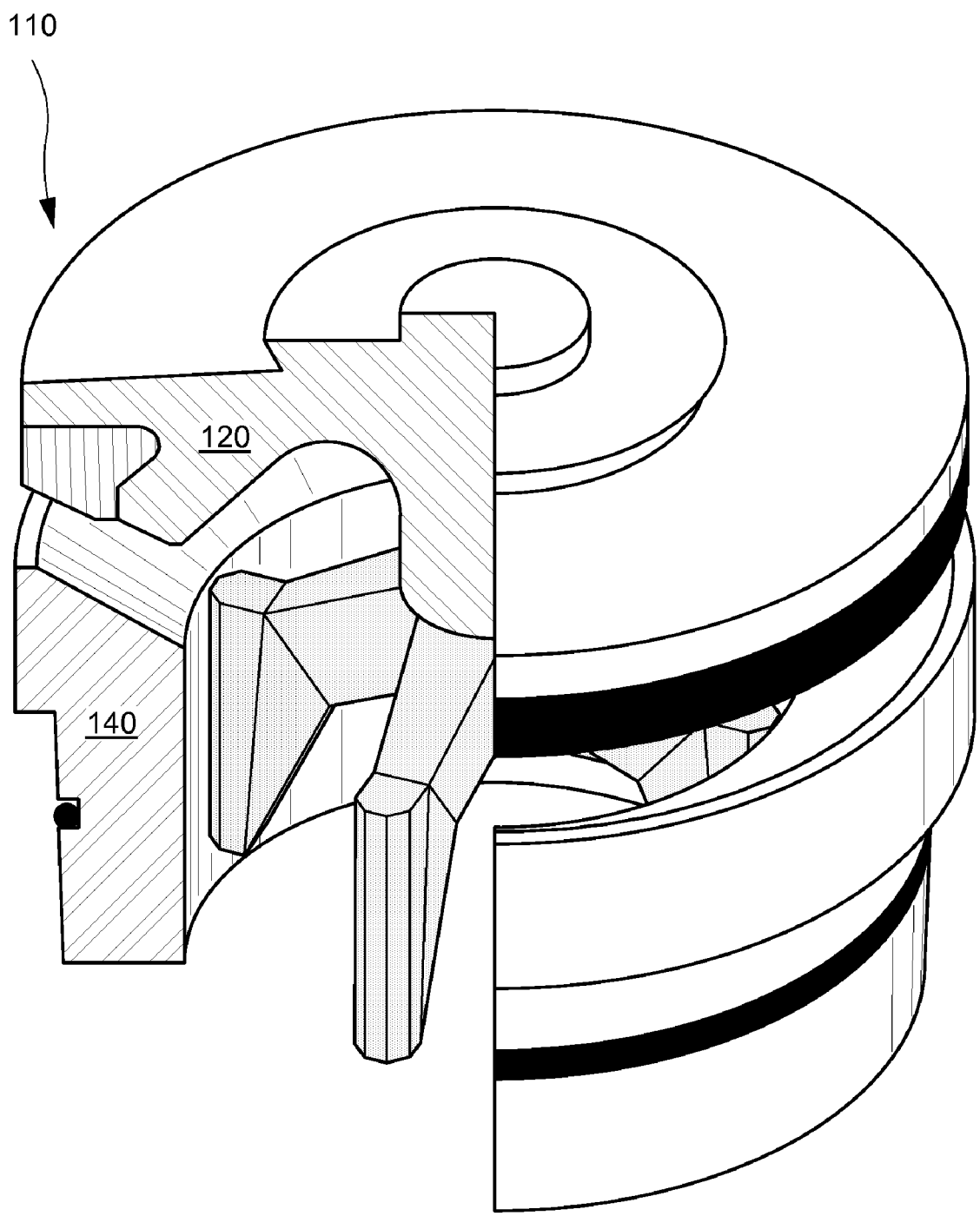
FIG. 1 schematically illustrates a typical valve body and seat assembly for fracturing pumps, the valve being in the open position.
Figure 2:
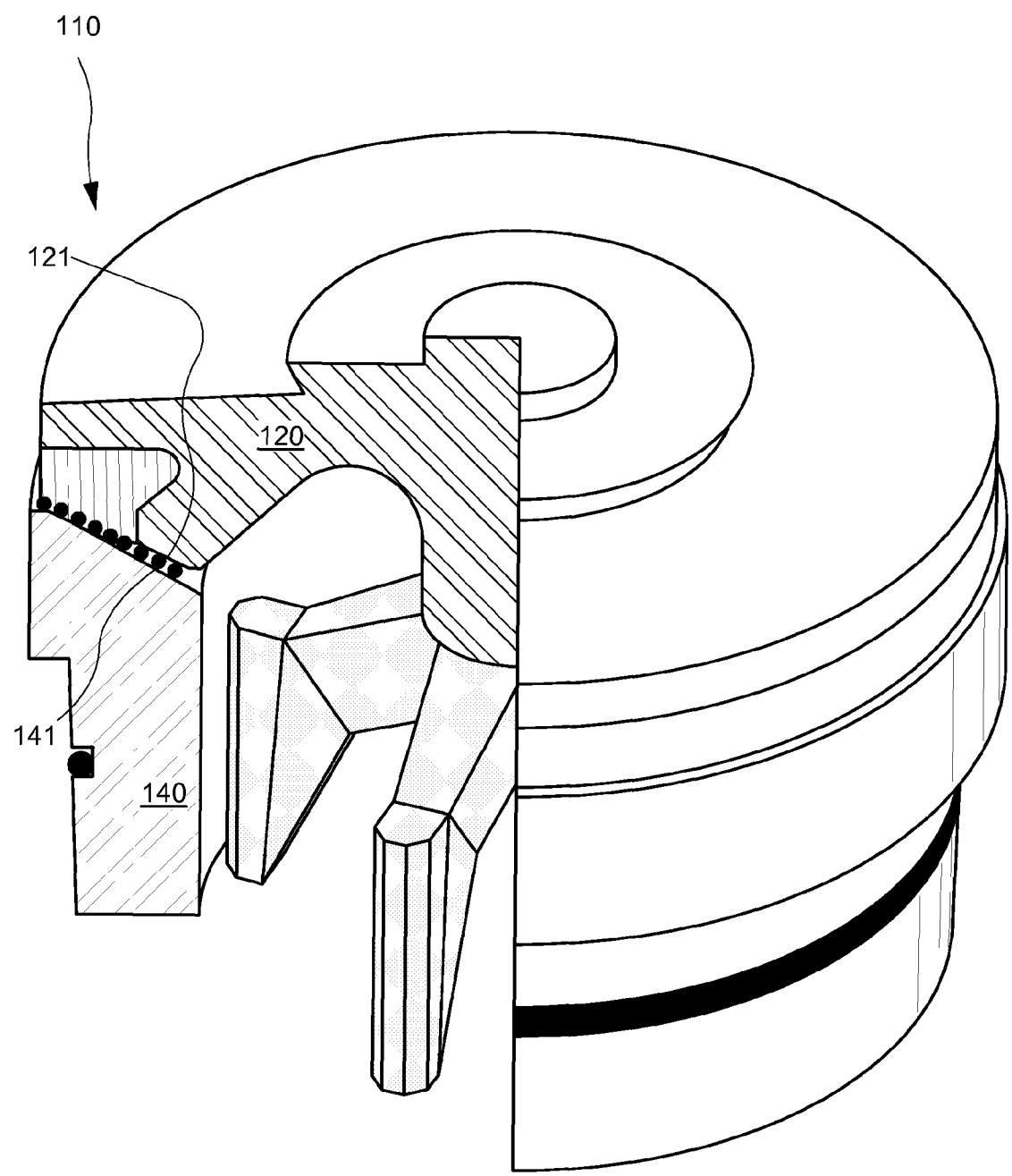
FIG. 2 schematically illustrates sand particles and/or aluminum oxide spheres trapped between mating surfaces during closure of the valve in FIG. 1.
Figure 3:
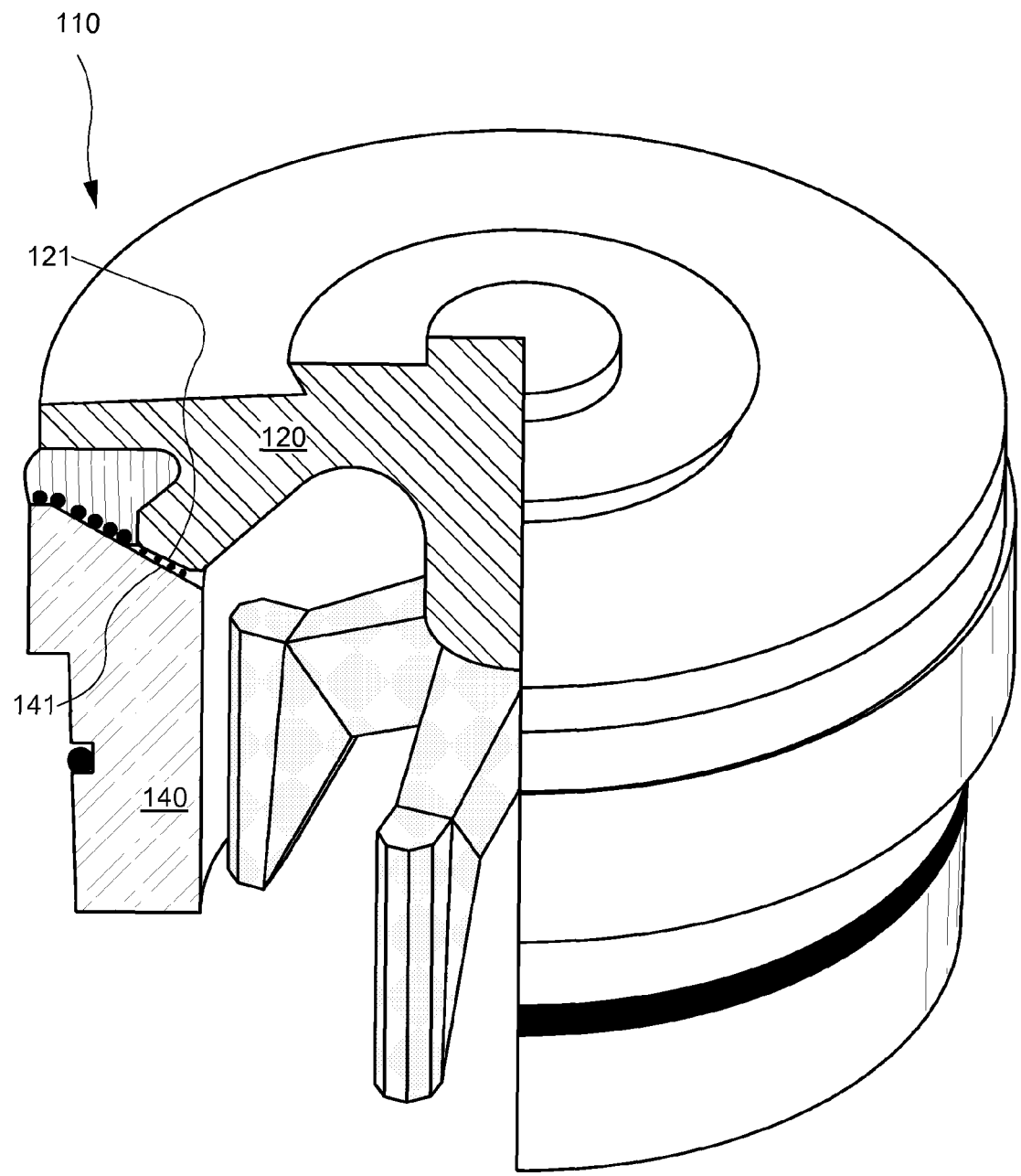
FIG. 3 schematically illustrates how the slurry particles that are not expelled from between the valve mating surfaces of FIGS. 1 and 2 are trapped and crushed upon completion of valve closure.
Figure 4:
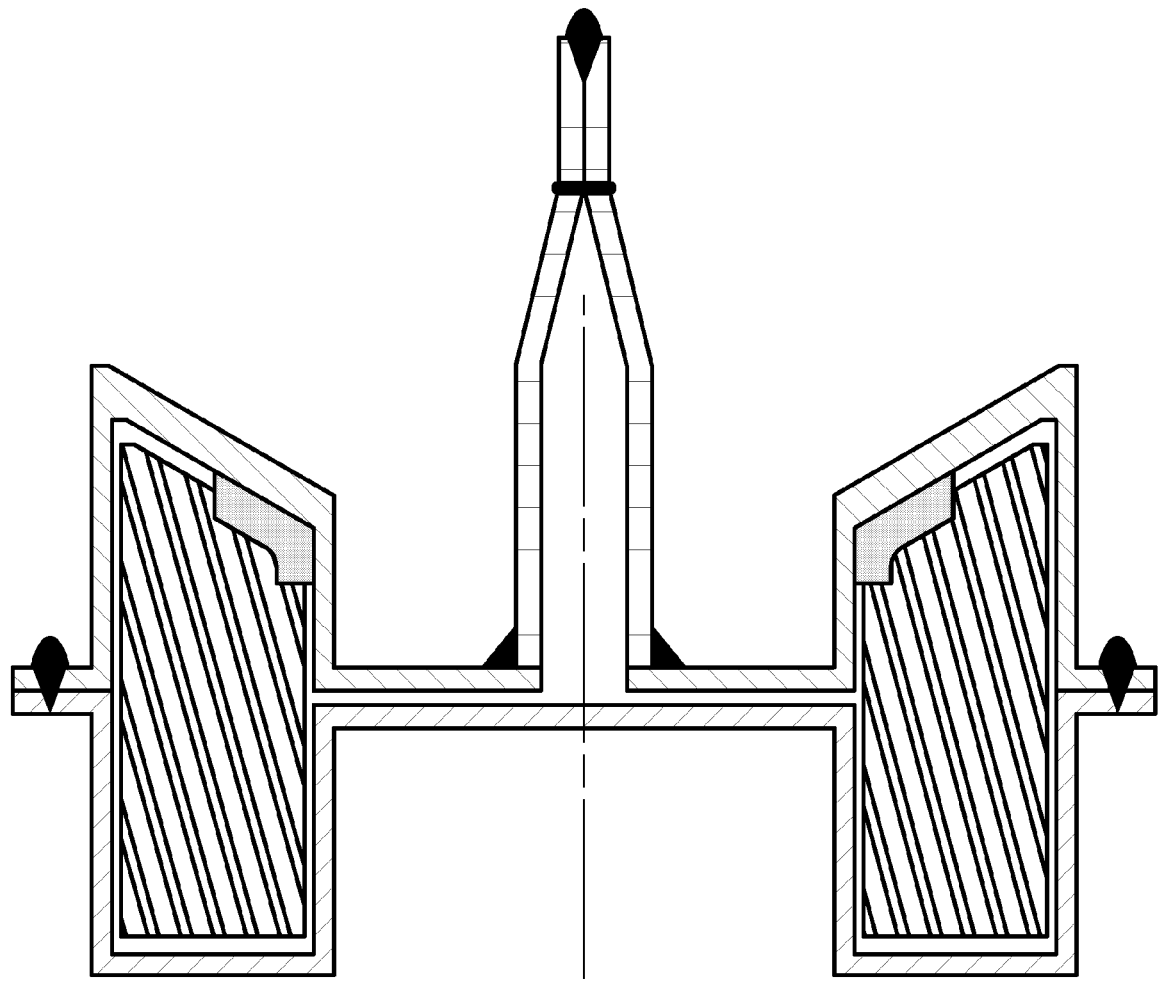
FIG. 4 schematically illustrates a cross-section of a typical conventional can assembly for HIPPING, wherein the valve seat substrate and P/M powder inlay preform are totally enclosed by the upper and lower portions of the can assembly.
Figure 5:
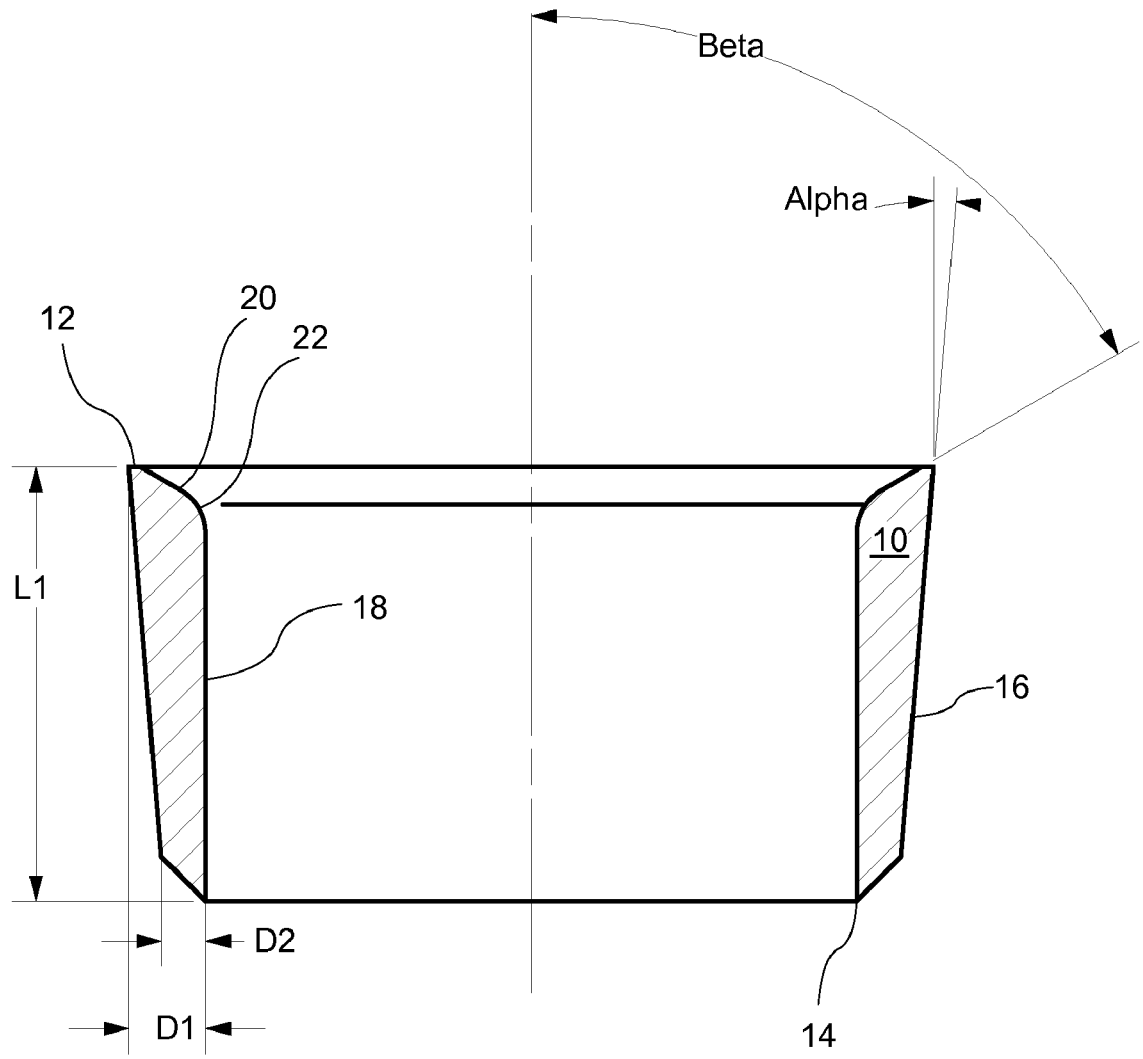
FIG. 5 schematically illustrates a partial cross-section of a sintered inlay ring having first and second ends, a frusto-conical outer surface, and a cylindrical inner surface.
Figure 9:
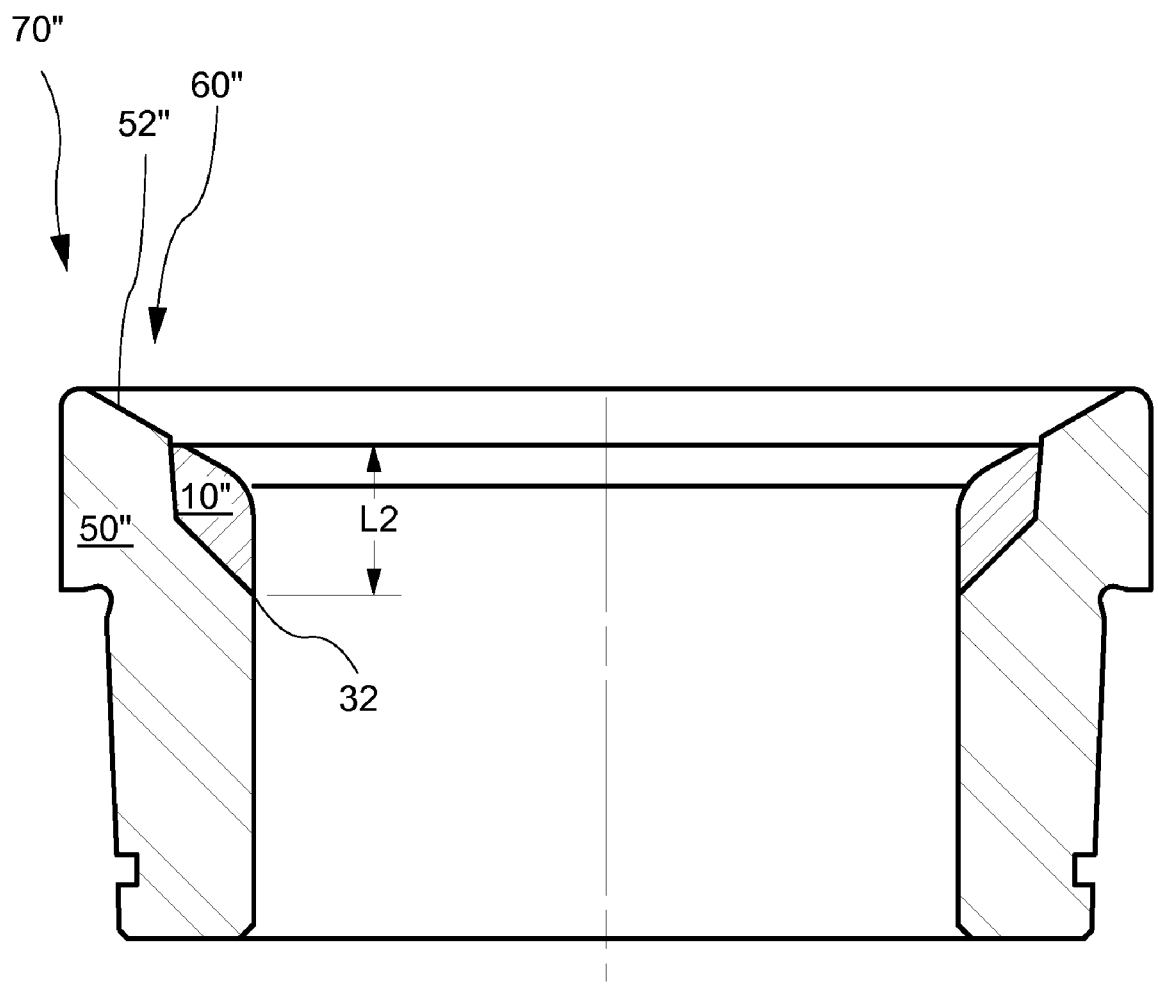
FIG. 9 schematically illustrates a second alternate embodiment of a valve seat analogous-in-part to the valve seat of FIG. 8.
Figure 10:
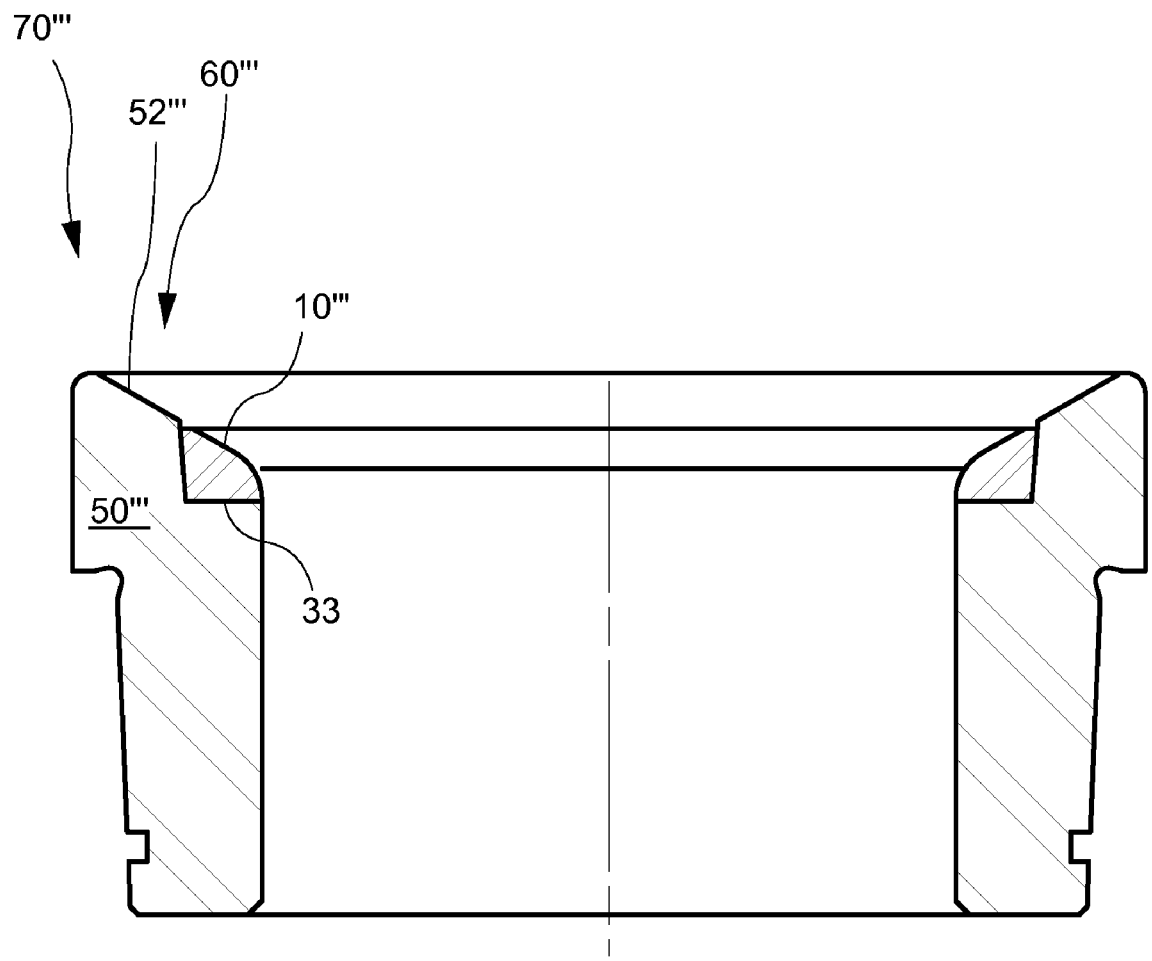
FIG. 10 schematically illustrates a third alternate embodiment of a valve seat analogous-in-part to the valve seat of FIG. 8.
Figure 11:
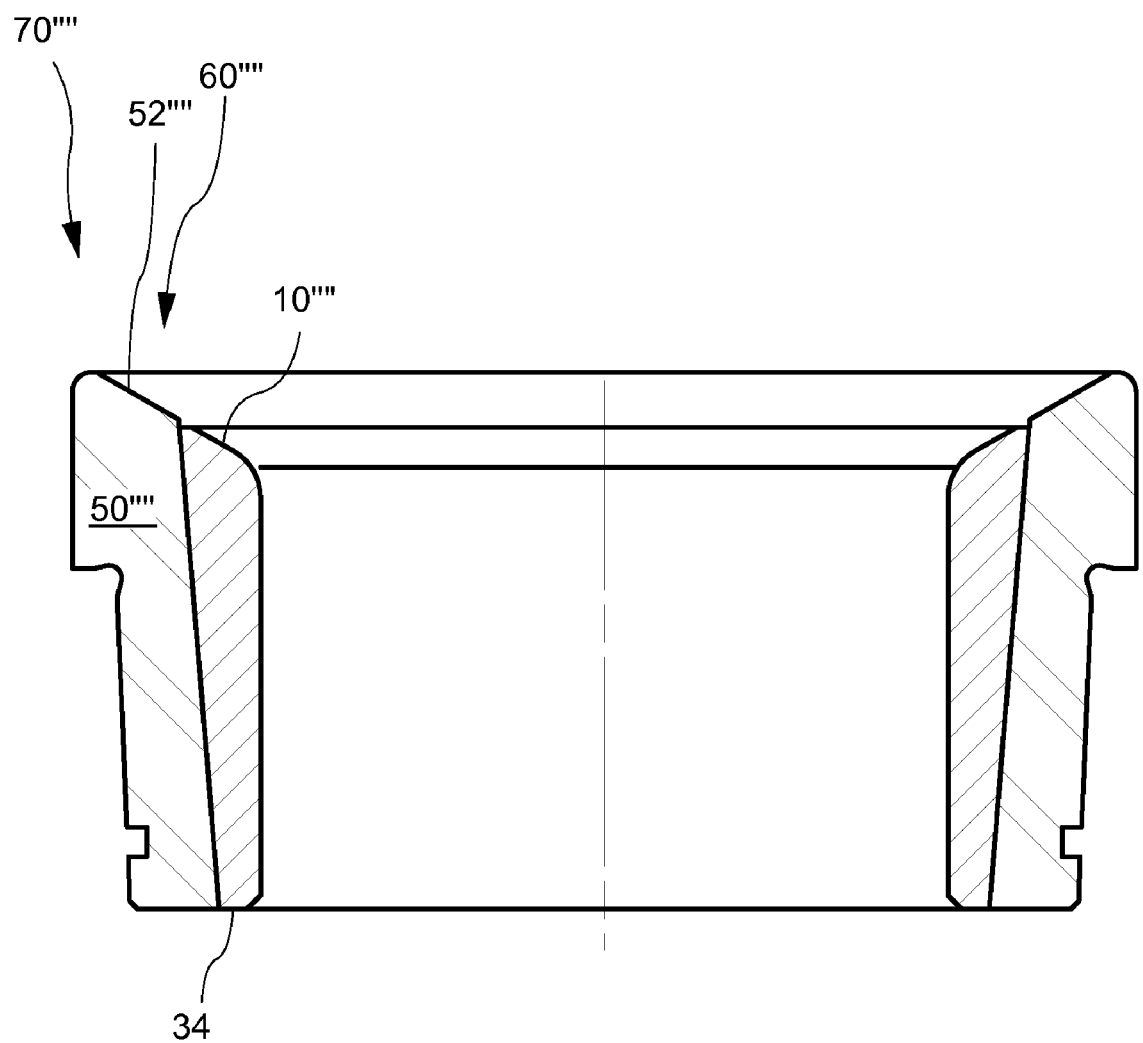
FIG. 11 schematically illustrates a fourth alternate embodiment of a valve seat analogous-in-part to the valve seat of FIG. 8.

FIG. 5 schematically illustrates a cross-section of a portion of a typical configuration of a sintered inlay ring 10 having a first end, a second end, a frusto-conical outer surface with an outer surface half-angle alpha, and a cylindrical inner surface. The outer surface half-angle alpha is accurately ground after sintering to obtain an initial predetermined shape for each configuration of inlay ring 10. A first embodiment of the invention comprises inlay ring 10, which is substantially symmetrical about an inlay ring longitudinal axis and comprises at least one metal carbide and at least one nonvolatile cement. Inlay ring 10 has an inlay ring first end 12 spaced longitudinally apart a distance L1 from an inlay ring second end 14, and inlay ring 10 further has a frusto-conical outer surface 16 spaced radially apart from a cylindrical inner surface 18. Longitudinal spacing between inlay ring first and second ends may differ from L1 in inlay ring alternate configurations (see, e.g., distance L2 in FIG. 9). In the first embodiment, inlay ring first end 12 extends a first radial distance D1 between frusto-conical outer surface 16 and cylindrical inner surface 18, and inlay ring second end 14 extends a second radial distance D2 between frusto-conical outer surface 16 and cylindrical inner surface 18, first radial distance D1 exceeding second radial distance D2. Frusto-conical outer surface 16 has an outer surface half-angle alpha with the inlay ring longitudinal axis, and inlay ring first end 12 comprises a frusto-conical surface 20 having an inlay ring first end half-angle beta with the inlay ring longitudinal axis, the inlay ring first end half-angle beta exceeding the outer surface half-angle alpha. Inlay ring first end 12 further comprises a curved intersection 22 with the cylindrical inner surface 18, curved intersection 22 having a radius between about 0.5 times and about 1.2 times the first radial distance D1. Inlay ring second end 14 may comprise frusto-conical and/or planar portions in various inlay ring alternate configurations as shown schematically in FIG. 8 (configuration 10'), FIG. 9 (configuration 10"), FIG. 10 (configuration 10'"), and FIG. 11 (configuration 10""). Inlay ring 10 (or any alternate configuration thereof) comprises between about 1% and about 3% voids, and further comprises between about 70% and about 98% metal carbide. Further, inlay ring 10 (or any alternate configuration thereof) has an inlay ring modulus of elasticity which is substantially greater than the modulus of elasticity of a hull ring to which it is sealingly vacuum brazed. Thus, when an inlay ring 10 (or any alternate configuration thereof) and a hull ring are subjected to HIP after they are sealingly vacuum brazed together (the hull ring substantially surrounding and closely spaced around inlay ring), the inlay ring tends to substantially retain its initial predetermined shape while the hull ring tends to conform to that initial predetermined shape.

Figure 6:
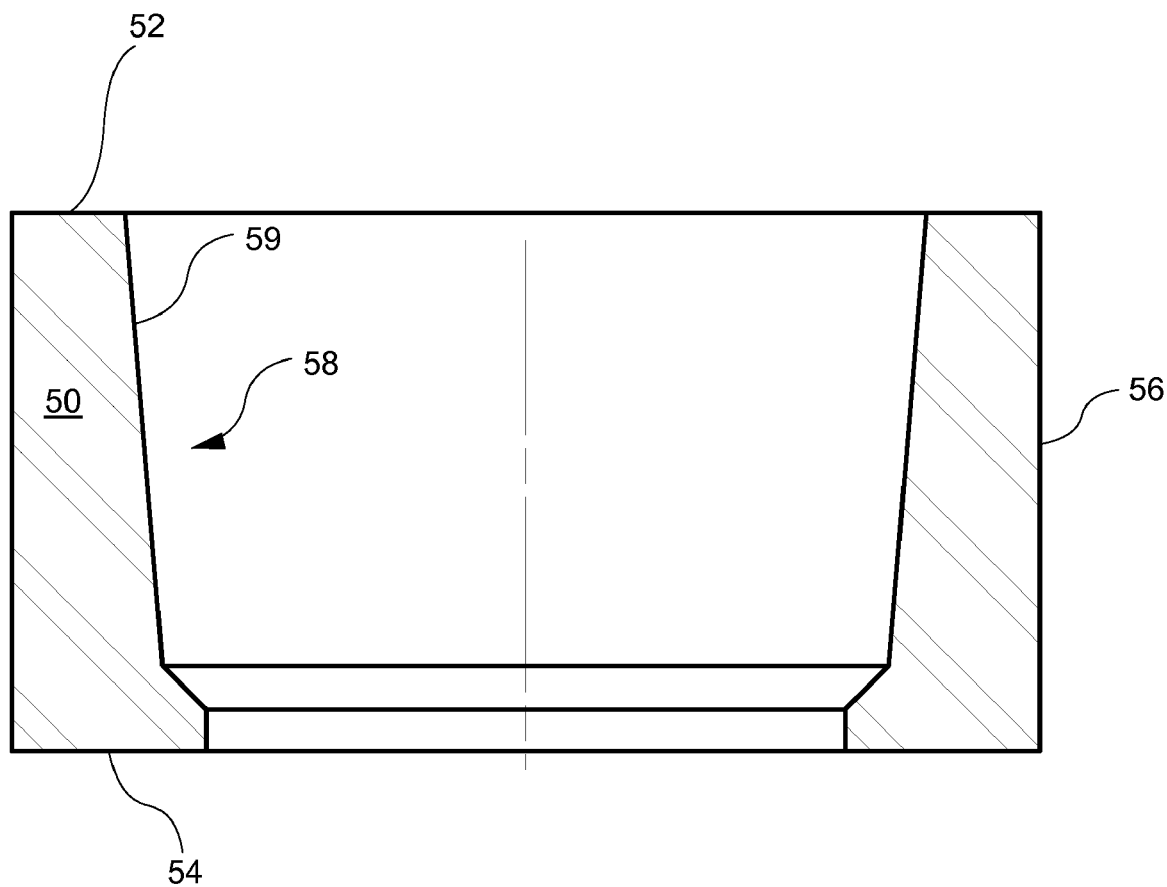
FIG. 6 schematically illustrates a cross-section of a hull ring having first and second ends, a frusto-conical inner surface, and an outer surface.
Figure 7:
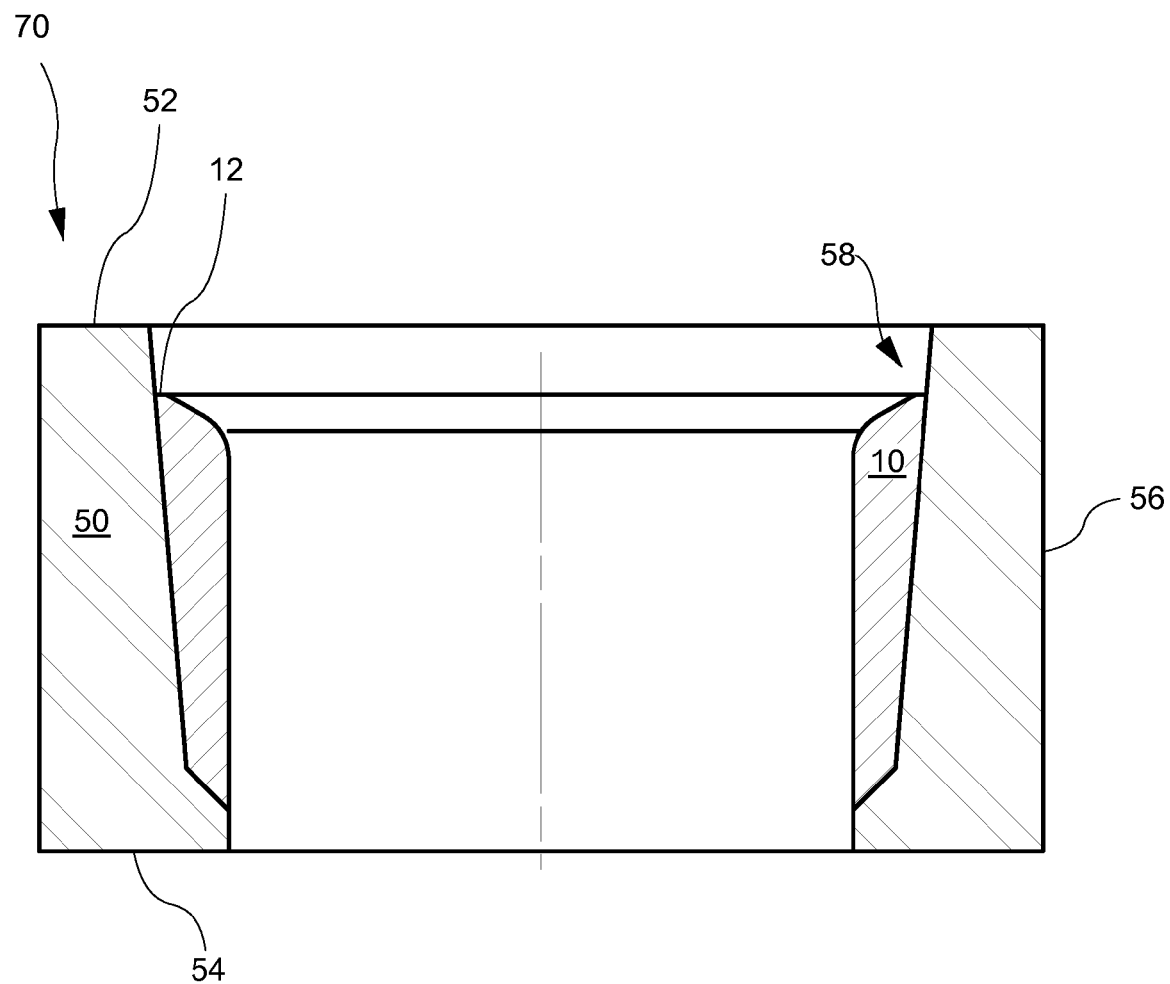
FIG. 7 schematically illustrates a cross-sectional view of an assembly comprising the sintered ring-shaped inlay portion of FIG. 5 and the ring-shaped hull portion of FIG. 6.

FIG. 6 schematically illustrates a second embodiment of the invention (i.e., a cross-section of an unfinished hull ring having a first end, a second end, an inner surface having at least one frusto-conical portion, and an outer surface). FIG. 7 schematically illustrates a third embodiment of the invention (i.e., a cross-sectional view of an assembly 70 comprising the sintered inlay ring 10 of FIG. 5 and the unfinished hull ring 50 of FIG. 6). Hull ring 50 has a hull ring first end 52 spaced longitudinally apart from a hull ring second end 54, and hull ring 50 further has a hull ring outer surface 56 spaced radially apart from a hull ring inner surface 58. Hull ring inner surface 58, in turn, comprises inner surface frusto-conical portion 59 having an inner surface half-angle gamma. Assembly 70 comprises a hull ring 50 (the unfinished hull ring of FIGS. 6 and 7) substantially surrounding and closely spaced around inlay ring 10, the longitudinal axis of inlay ring 10 being substantially collinear with the longitudinal axis of hull ring 50. Alternative finished configurations of hull ring 50 are shown in the first embodiment valve seat 70' of FIG. 8 (finished configuration 50'), the second embodiment valve seat 70" of FIG. 9 (finished configuration 50"), the third embodiment valve seat 70'" of FIG. 10 (finished configuration 50'"), and the fourth embodiment valve seat 70"" of FIG. 11 (finished configuration 50""). Each hull ring configuration is substantially symmetrical about a hull ring longitudinal axis and comprises steel (e.g., H13 tool steel). Each finished configuration of hull ring 50 (i.e., 50', 50", 50'", and 50"") includes a hull ring first end comprising a frusto-conical portion (i.e., 60', 60", 60'", and 60"" respectively) having a hull ring first end half-angle delta with the hull ring longitudinal axis. In each alternate valve seat embodiment (i.e., 70', 70", 70'", and 70""), a portion of inlay ring first end 12 is adjacent to a portion of hull ring first end (52', 52", 52'", and 52"" respectively), and inlay ring first end half-angle beta substantially equals hull ring first end half-angle delta.

Figure 8:
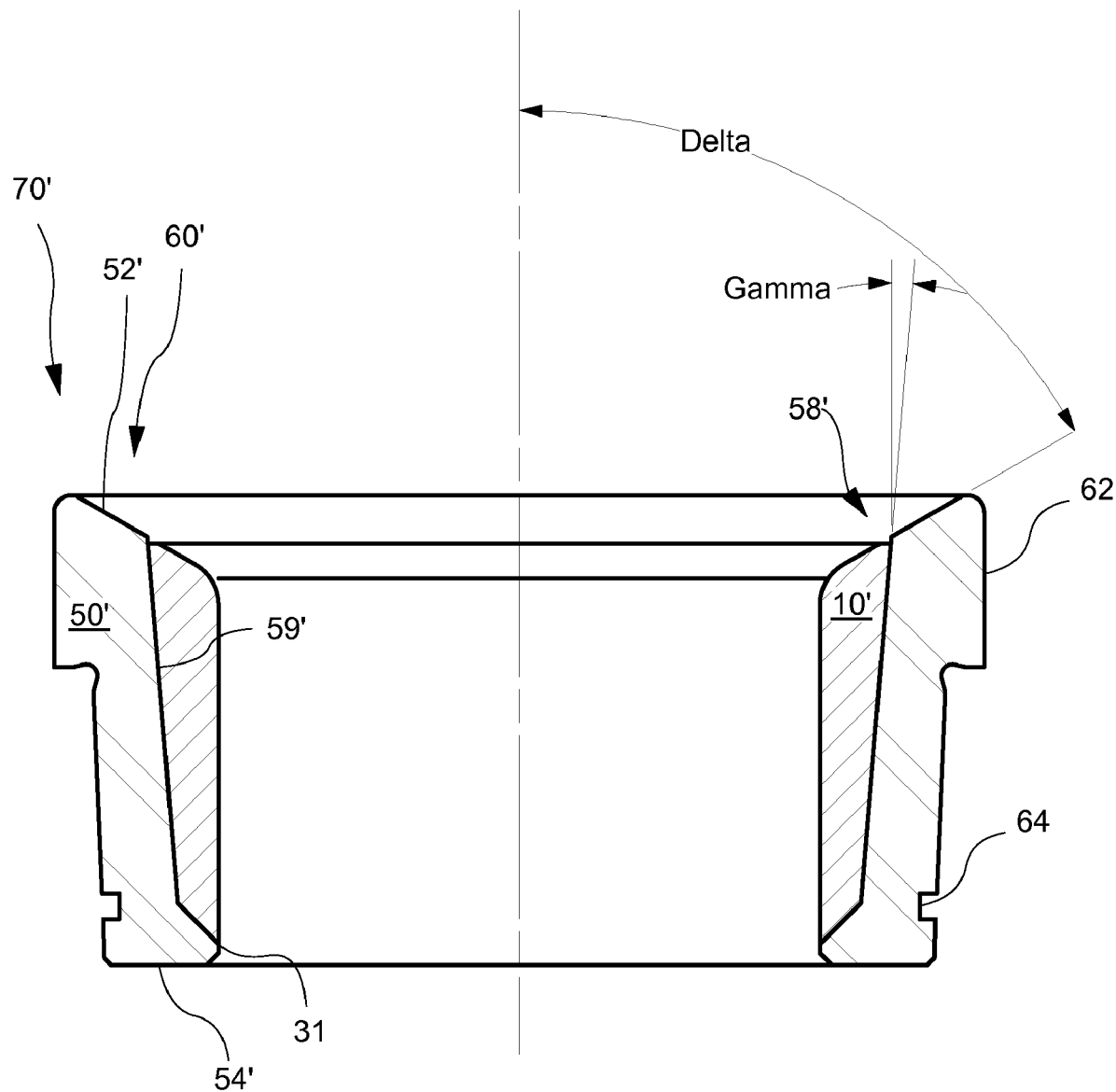
FIG. 8 schematically illustrates a cross-sectional view of a first alternate embodiment of a valve seat made by sealingly vacuum brazing and HIPPING the assembly of FIG. 7, followed by finish machining.

FIG. 8 schematically shows a first embodiment valve seat 70' comprising an inlay ring 10' (analogous-in-part to inlay ring 10) and a hull ring 50' (analogous-in-part to hull ring 50). Valve seat 70' is obtained after the inlay ring and hull ring of assembly 70 are sealingly vacuum brazed together (with a filler metal) and then HIPPED (i.e., exposed to HIP), followed by finish machining. Due to its relatively high modulus of elasticity (compared to the hull ring modulus of elasticity), inlay ring 10' substantially retains the initial predetermined shape to which inlay ring 10 was ground. And due to its relatively lower modulus of elasticity, hull ring 50 would be relatively more affected (e.g., distorted) by HIP than inlay ring 10. Thus, the finish machining required after HIPPING to make valve seat 70' produces a hull ring configuration 50' which differs from the shape of hull ring 50. Adding to such differences in shape are features (comprising, for example, peripheral flange 62, an o-ring groove 64, and hull ring first end 52') that are typically added during finish machining to make valve seat 70'. Hull ring first end 52' comprises a hull ring first end frusto-conical portion 60', and the hull ring second end 54' differs from second end 54 due, for example, to finish machining Hull ring inner surface 58' (which differs slightly from inner surface 58 due to slight distortion associated with HIPPING) comprises an inner surface frusto-conical portion 59' extending longitudinally from hull ring first end 52'. And the inner surface frusto-conical portion 59' has an inner surface half-angle gamma with the hull ring longitudinal axis, the hull ring first end half-angle delta exceeding the inner surface half-angle gamma. Analogous-in-part descriptions apply to analogous-in-part hull rings 50" (see FIG. 9), 50'" (see FIG. 10) and 50"" (see FIG. 11). To facilitate the fitting together of inlay ring 10 (see FIG. 5) with hull ring 50 (see FIG. 6) in a manner analogous in part to that shown in FIG. 7, the outer surface half-angle alpha substantially equals the inner surface half-angle gamma, and these angles are not substantially altered by exposure to HIP.

Note that alternative valve seat embodiments schematically illustrated in FIGS. 8-11 show inlay ring configurations differing in, for example, longitudinal spacing apart of first and second ends, as well as shaping of inlay ring second ends. As illustrated, inlay ring second ends may be substantially frusto-conical (see, e.g., inlay second end 31 in FIG. 8 and inlay ring second end 32 in FIG. 9) or substantially planar (see, e.g., inlay ring 33 in FIG. 10). Inlay ring second ends may also comprise one or more planar portions together with one or more frusto-conical portions (see, e.g., inlay ring 34 in FIG. 11).

A fifth embodiment of the invention comprises a method of making an inlay on a metal substrate (see, e.g., valve seat 70' in FIG. 8), the method comprising providing a metal substrate (see, e.g., hull ring 50 in FIG. 6) having a substrate modulus of elasticity. The method then comprises providing a compressed powdered metal inlay (see, e.g., inlay ring 10 in FIG. 5) comprising at least one metal carbide and at least one nonvolatile cement. The method then comprises sintering the compressed powdered metal inlay and grinding to an initial predetermined shape to make an inlay preform, the inlay preform having a preform modulus of elasticity substantially greater than the substrate modulus of elasticity. The method then comprises sealingly vacuum brazing the inlay preform to the metal substrate to make an evacuated assembly having at least one evacuated bonding area between the inlay preform and the metal substrate. And the method finally comprises applying hot-isostatic-pressure to the evacuated assembly for bonding (by fusing) the metal substrate to the inlay preform for making an inlay on a metal substrate.

A sixth embodiment of the invention comprises an inlay ring analogous in part to inlay ring 10 in FIG. 5. See FIG. 5 for schematic illustrations of portions of the inlay ring of the fifth embodiment. The inlay ring of the fifth embodiment is substantially symmetrical about an inlay ring longitudinal axis and comprises at least one metal carbide and at least one nonvolatile cement. The inlay ring has an inlay ring first end spaced longitudinally apart from an inlay ring second end, and the inlay ring further has a frusto-conical outer surface spaced radially apart from a cylindrical inner surface. Wherein the inlay ring first end extends a first radial distance between the frusto-conical outer surface and the cylindrical inner surface, and the inlay ring second end extends a second radial distance between the frusto-conical outer surface and the cylindrical inner surface, the first radial distance exceeding the second radial distance. The frusto-conical outer surface has an outer surface half-angle with the inlay ring longitudinal axis, and the inlay ring first end comprises a frusto-conical surface having an inlay ring first end half-angle with the inlay ring longitudinal axis, the inlay ring first end half-angle exceeding the outer surface half-angle. The inlay ring first end further comprises a curved intersection with the cylindrical inner surface, the curved intersection having a radius between about 0.5 times and about 1.2 times the first radial distance. The inlay ring comprises between about 1% and about 3% voids, and further comprises between about 70% and about 98% metal carbide. herein said inlay ring has an inlay ring modulus of elasticity.

A seventh embodiment of the invention comprises a valve seat analogous in part to valve seat 70 in FIG. 7. See FIG. 7 for schematic illustrations of portions of the valve seat of the sixth embodiment. The valve seat of the sixth embodiment is symmetrical about a longitudinal axis. The valve seat comprises a ring-shaped inlay portion substantially symmetrical about the longitudinal axis and comprising at least one metal carbide and at least one nonvolatile cement. The ring-shaped inlay portion has an inlay portion first end spaced longitudinally apart from an inlay portion second end, and the ring-shaped inlay portion further has an inlay portion outer surface spaced radially apart from a cylindrical inner surface. The ring-shaped inlay portion has an inlay portion modulus of elasticity and a ring-shaped hull portion substantially symmetrical about said longitudinal axis and comprising steel. The ring-shaped hull portion has a hull portion modulus of elasticity, and a hull portion first end spaced longitudinally apart from a hull portion second end. The ring-shaped hull portion further has a hull portion outer surface spaced radially apart from a hull portion inner surface. The hull portion inner surface substantially surrounds and is fused to the inlay portion outer surface. Wherein the inlay portion modulus of elasticity is about 2 times to about 3 times the hull portion modulus of elasticity. And wherein the ring-shaped inlay portion has a radial thickness adjacent to the inlay portion first end. And wherein at least a portion of the inlay portion first end comprises a central valve seat contact area. And wherein the inlay portion first end further comprises a curved intersection with the cylindrical inner surface, the curved intersection being adjacent to the central valve seat contact area and has a radius between about 0.5 times and about 1.2 times the radial thickness. And wherein at least a portion of the hull portion first end comprises a lateral valve seat contact area, the lateral valve seat contact being peripherally adjacent to the central valve seat contact area.

What is claimed is:

1. An inlay ring substantially symmetrical about an inlay ring longitudinal axis and comprising at least one metal carbide and at least one nonvolatile cement, said inlay ring having an inlay ring first end spaced longitudinally apart from an inlay ring second end, and said inlay ring further having a frusto-conical outer surface spaced radially apart from a cylindrical inner surface, said inlay ring first end extending a first radial distance between said frusto-conical outer surface and said cylindrical inner surface, and said inlay ring second end extending a second radial distance between said frusto-conical outer surface and said cylindrical inner surface;

wherein said inlay ring comprises between about 1% and about 3% voids;
   wherein said inlay ring comprises between about 70% and about 98% metal carbide;
   wherein said inlay ring has an inlay ring modulus of elasticity;
   wherein said first radial distance exceeds said second radial distance;
   wherein said frusto-conical outer surface has an outer surface half-angle with said inlay ring longitudinal axis;
   wherein said inlay ring first end comprises a frusto-conical surface having an inlay ring first end half-angle with said inlay ring longitudinal axis;
   wherein said inlay ring first end half-angle exceeds said outer surface half-angle; and
   wherein said inlay ring first end further comprises a curved intersection with said cylindrical inner surface, said curved intersection having a radius between about 0.5 times and about 1.2 times said first radial distance.

2. The inlay ring of claim 1 wherein said at least one nonvolatile cement comprises cobalt.

3. The inlay ring of claim 1 wherein said at least one metal carbide comprises tungsten.

4. A hull ring substantially symmetrical about a hull ring longitudinal axis and comprising steel, said hull ring having a hull ring first end spaced longitudinally apart from a hull ring second end, and said hull ring further having a hull ring outer surface spaced radially apart from a hull ring inner surface, said hull ring first end comprising a hull ring first end frusto-conical portion extending outward beginning a first radial distance from said longitudinal axis, and said hull ring second end extending outward beginning a second radial distance from said longitudinal axis;

wherein said hull ring has a hull ring modulus of elasticity;

wherein said first radial distance exceeds said second radial distance;

wherein said hull ring inner surface comprises an inner surface frusto-conical portion extending longitudinally from said hull ring first end;

wherein said inner surface frusto-conical portion has an inner surface half-angle with said hull ring longitudinal axis; and wherein said hull ring first end frusto-conical portion has a hull ring first end half-angle with said hull ring longitudinal axis, said hull ring first end half-angle exceeding said inner surface half-angle.

5. The hull ring of claim 4 wherein said hull ring outer surface comprises at least one external mounting flange.

6. The hull ring of claim 4 wherein said hull ring comprises H13 tool steel.

7. A method of making a valve seat, the method comprising:

providing an inlay ring having an initial predetermined shape and comprising at least one metal carbide and at least one nonvolatile cement, said inlay ring having an inlay ring first end, an inlay ring second end, an inlay ring outer surface and an inlay ring inner surface, and said inlay ring having an inlay ring modulus of elasticity;

providing a hull ring comprising steel, said hull ring having a hull ring inner surface and a hull ring outer surface, and said hull ring having a hull ring modulus of elasticity, said hull ring inner surface substantially surrounding and closely spaced around said inlay ring outer surface, said inlay ring modulus of elasticity being about 2 times to about 3 times said hull ring modulus of elasticity;

sealingly vacuum brazing with a filler metal said inlay ring to said hull ring adjacent to said inlay ring first end and said inlay ring second end to form an evacuated hull-inlay assembly;

applying hot isostatic pressure to said evacuated hull-inlay assembly sufficient to fuse said hull ring to said inlay ring to form a fused assembly; and finish machining said fused assembly to form a valve seat.

8. The method of claim 7 wherein at least one said nonvolatile cement comprises cobalt.

9. The method of claim 7 wherein at least one said metal carbide comprises tungsten.

10. The method of claim 7 wherein said filler metal comprises BNi-5.

11. The method of claim 7 wherein said hull ring outer surface comprises at least one mounting flange.

12. The method of claim 7 wherein said hull ring comprises H13 tool steel.

13. A valve seat symmetrical about a longitudinal axis and comprising a ring-shaped inlay portion substantially symmetrical about said longitudinal axis and comprising at least one metal carbide and at least one nonvolatile cement, said ring-shaped inlay portion having an inlay portion first end spaced longitudinally apart from an inlay portion second end, and said ring-shaped inlay portion further having an inlay portion frusto-conical outer surface spaced radially apart from a cylindrical inner surface, and said ring-shaped inlay portion having an inlay portion modulus of elasticity;

a ring-shaped hull portion substantially symmetrical about said longitudinal axis and comprising steel, said ring-shaped hull portion having a hull portion modulus of elasticity, and said ring-shaped hull portion having a hull portion first end spaced longitudinally apart from a hull portion second end, and said ring-shaped hull portion further having a hull portion outer surface spaced radially apart from a hull portion inner surface;

wherein said hull portion inner surface closely surrounds and is fused to said inlay portion outer surface;

wherein said inlay portion modulus of elasticity is about 2 times to about 3 times said hull portion modulus of elasticity;

wherein said ring-shaped inlay portion has a radial thickness adjacent to said inlay portion first end;

wherein at least a portion of said inlay portion first end comprises a central valve seat contact area;

wherein said inlay portion first end further comprises a curved intersection with said cylindrical inner surface, said curved intersection being adjacent to said central valve seat contact area and having a radius between about 0.5 times and about 1.2 times said radial thickness; and wherein at least a portion of said hull portion first end comprises a lateral valve seat contact area, said lateral valve seat contact area being peripherally adjacent to said central valve seat contact area.

14. The valve seat of claim 13 wherein said hull portion outer surface comprises at least one mounting flange.

15. The valve seat of claim 13 wherein at least one said nonvolatile cement comprises cobalt.

16. The valve seat of claim 13 wherein at least one said metal carbide comprises tungsten.

17. A method of making an inlay on a metal substrate, the method comprising providing a metal substrate having a substrate modulus of elasticity;

providing a compressed powdered metal inlay comprising at least one metal carbide and at least one nonvolatile cement;

sintering said compressed powdered metal inlay in an initial predetermined shape to make an inlay preform, said inlay preform having a preform modulus of elasticity substantially greater than said substrate modulus of elasticity;

sealingly vacuum brazing said inlay preform to said metal substrate to make an evacuated assembly having at least one evacuated bonding area between said inlay preform and said metal substrate; and applying hot-isostatic-pressure to said evacuated assembly for fusing said metal substrate to said inlay preform in at least one said evacuated bonding area for making an inlay on a metal substrate.

* * * * *